United States Patent
Montanari et al.

(10) Patent No.: US 10,611,110 B2
(45) Date of Patent: Apr. 7, 2020

(54) EXPANDABLE FORMING DRUM, AND PROCESS FOR BUILDING TYRES

(71) Applicant: PIRELLI TYRE S.P.A., Milan (IT)

(72) Inventors: Silvio Montanari, Milan (IT); Maurizio Marchini, Milan (IT); Oliver Haupt, Breuberg (DE); Mario Mariani, Milan (IT); Davide Lupo Conti, Milan (IT)

(73) Assignee: PIRELLI TYRE S.p.A., Milan (IT)

(*) Notice: Subject to any disclaimer, the term of this patent is extended or adjusted under 35 U.S.C. 154(b) by 536 days.

(21) Appl. No.: 15/104,731

(22) PCT Filed: Dec. 22, 2014

(86) PCT No.: PCT/IB2014/067210
§ 371 (c)(1),
(2) Date: Jun. 15, 2016

(87) PCT Pub. No.: WO2015/097636
PCT Pub. Date: Jul. 2, 2015

(65) Prior Publication Data
US 2017/0001395 A1    Jan. 5, 2017

(30) Foreign Application Priority Data

Dec. 23, 2013 (IT) .............................. MI2013A2186

(51) Int. Cl.
*B29D 30/12* (2006.01)
*B29D 30/16* (2006.01)
(Continued)

(52) U.S. Cl.
CPC ............. *B29D 30/12* (2013.01); *B29D 30/10* (2013.01); *B29D 30/16* (2013.01); *B29D 30/245* (2013.01);
(Continued)

(58) Field of Classification Search
CPC ........ B29D 30/08; B29D 30/10; B29D 30/12; B29D 30/16; B29D 30/24; B29D 30/245;
(Continued)

(56) References Cited

U.S. PATENT DOCUMENTS 3,485,692 A * 12/1969 Frazier ................. B29D 30/245
156/123
3,971,694 A   7/1976 Gazuit
(Continued)

FOREIGN PATENT DOCUMENTS

DE    2 300 330    7/1974
DE    73 27 475    9/1977
(Continued)

OTHER PUBLICATIONS

International Search Report from the European Patent Office for International Application No. PCT/IB2014/067210, dated Apr. 23, 2015.
(Continued)

*Primary Examiner* — Robert C Dye
*Assistant Examiner* — Sedef E Paquette
(74) *Attorney, Agent, or Firm* — Finnegan, Henderson, Farabow, Garrett & Dunner, L.L.P.

(57) ABSTRACT

A toroidal forming drum and a process for budding tyres. The toroidal forming drum is expanded within a shaped carcass sleeve for supporting the carcass sleeve against an abutment surface externally provided by the forming drum. An elementary semi-finished product is applied around the shaped carcass sleeve by pressing the elementary semi-finished product toward the abutment surface. The abutment surface has circumferential rows of solid portions alternated with hollow portions. The solid portions, arranged along axially opposite circumferential edges of the abutment surface, have a transverse size between 10% and 60% of a (Continued)

transverse size presented by the solid portions arranged in proximity to an axial centreline plane of the abutment surface.

28 Claims, 10 Drawing Sheets

(51) Int. Cl.
*B29D 30/24* (2006.01)
*B29D 30/10* (2006.01)
*B29K 21/00* (2006.01)

(52) U.S. Cl.
CPC .... *B29D 2030/105* (2013.01); *B29K 2021/00* (2013.01)

(58) Field of Classification Search
CPC .............. B29D 30/36; B29D 2030/105; B29D 2030/2657; B29K 2021/00
USPC ......................................................... 156/415
See application file for complete search history.

(56) References Cited

U.S. PATENT DOCUMENTS

| | | | |
|---|---|---|---|
| 4,547,251 A * | 10/1985 | Landsness | B29D 30/242 156/133 |
| 2004/0050499 A1 | 3/2004 | Barody | |
| 2005/0061417 A1 * | 3/2005 | Armellin | B29D 30/1621 152/555 |
| 2006/0108051 A1 | 5/2006 | Lacagnina | |
| 2006/0130959 A1 | 6/2006 | Lacagnina | |
| 2008/0017298 A1 | 1/2008 | Iyanagi | |
| 2009/0020200 A1 | 1/2009 | Ogawa et al. | |
| 2011/0315323 A1 | 12/2011 | Lipsa | |
| 2013/0075041 A1 | 3/2013 | Marechal et al. | |

FOREIGN PATENT DOCUMENTS

| | | |
|---|---|---|
| EP | 1 724 099 | 11/2006 |
| JP | 2007-136935 | 6/2007 |
| WO | WO 2004/041520 | 5/2004 |
| WO | WO 2004/041522 | 5/2004 |
| WO | WO 2010/126507 | 11/2010 |

OTHER PUBLICATIONS

Written Opinion of the International Searching Authority from the European Patent Office for International Application No. PCT/IB2014/067210, dated Apr. 23, 2015.
Notification of the First Office Action dated Jan. 17, 2018, from the State Intellectual Property Office of the People's Republic of China, in counterpart Chinese Application No. 201480070468.6.
Notification of the Second Office Action dated Aug. 15, 2018, from the State Intellectual Property Office of the People's Republic of China, in counterpart Chinese Application No. 201480070468.6.

* cited by examiner

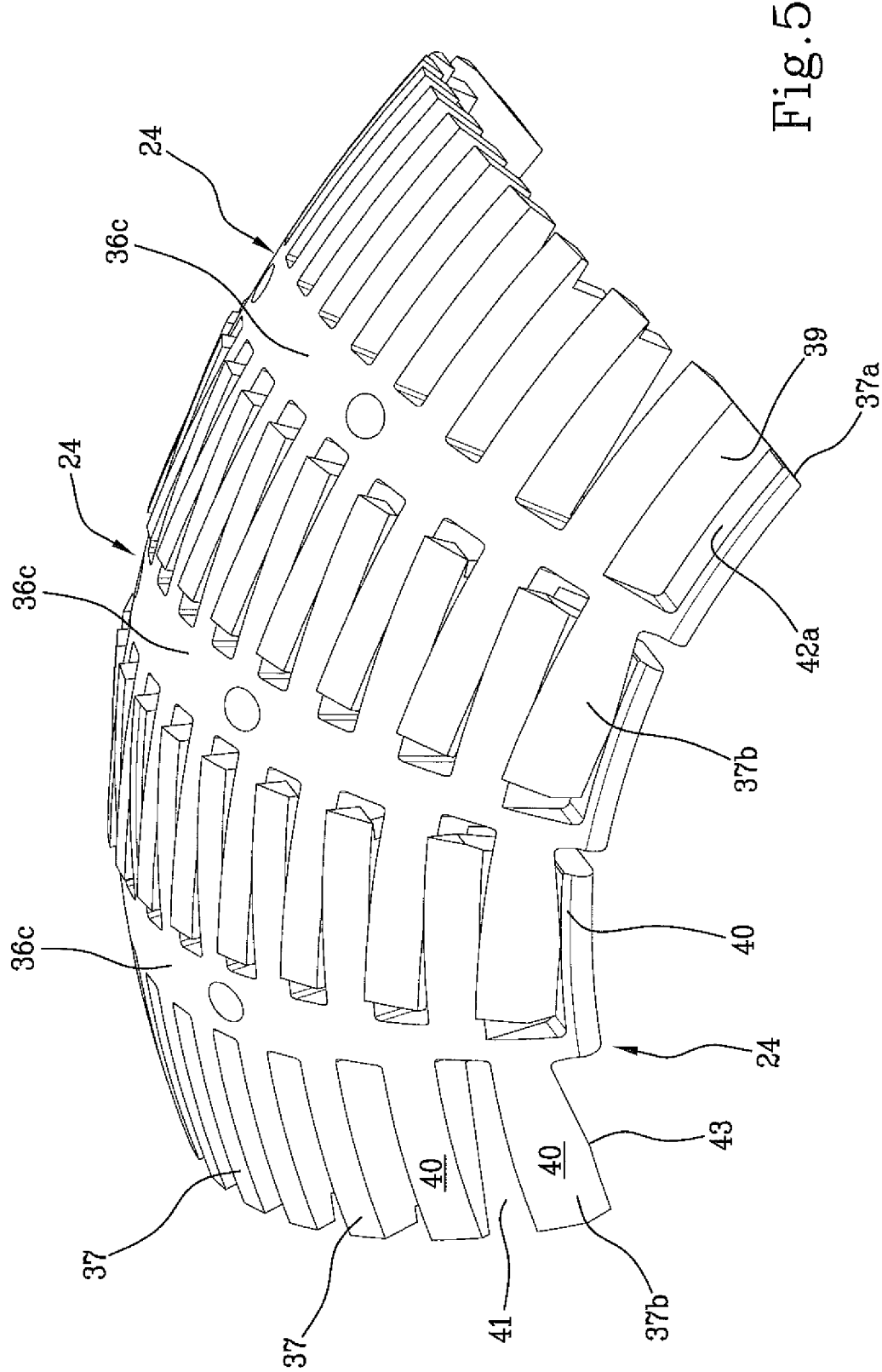

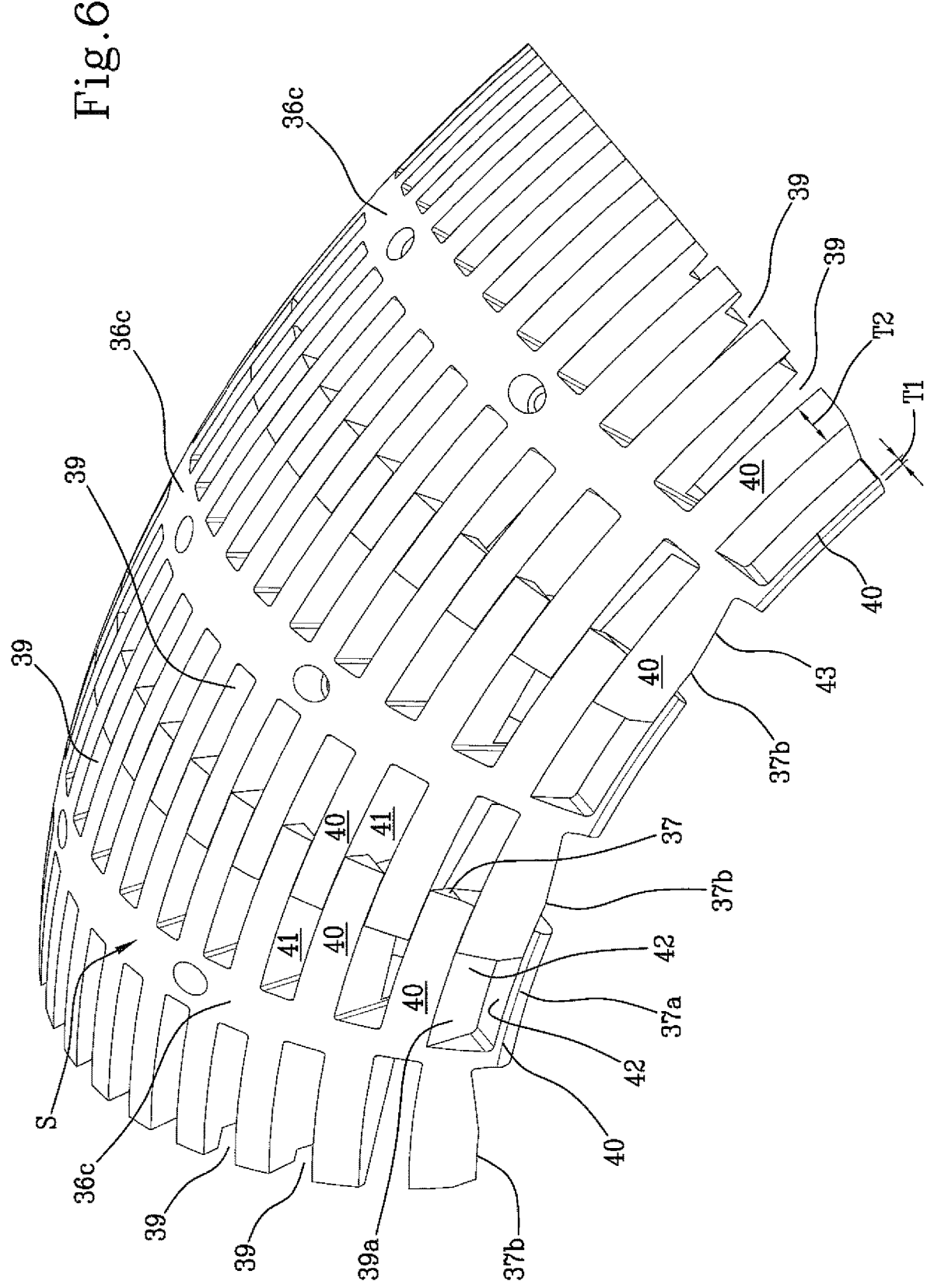

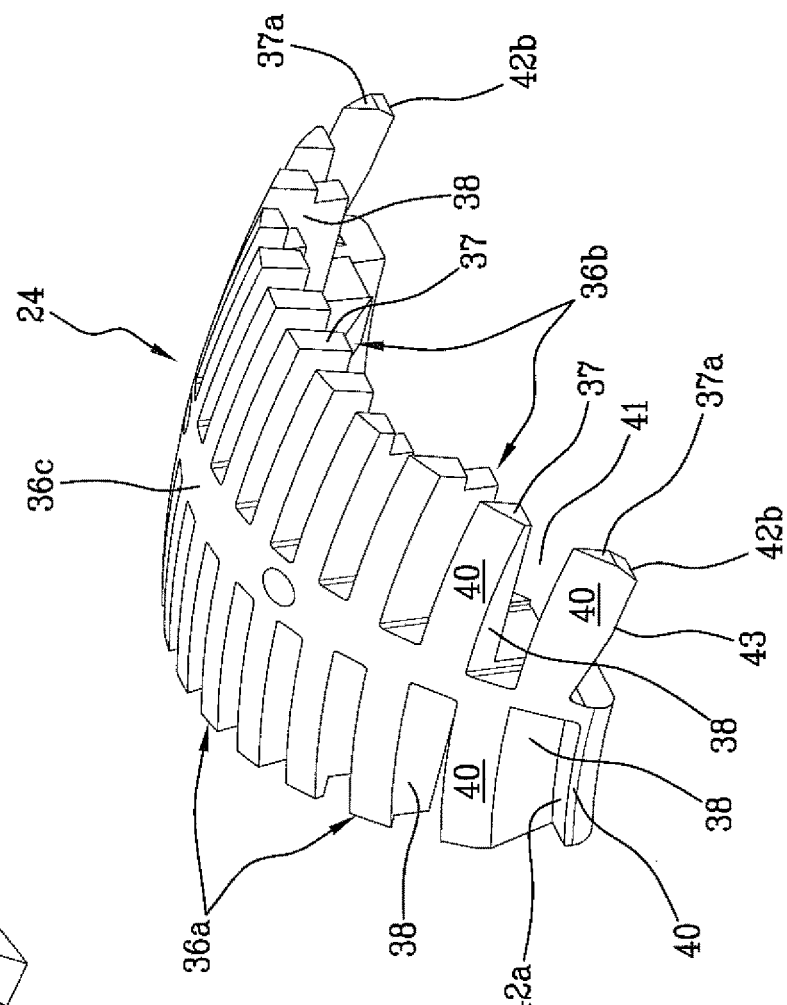
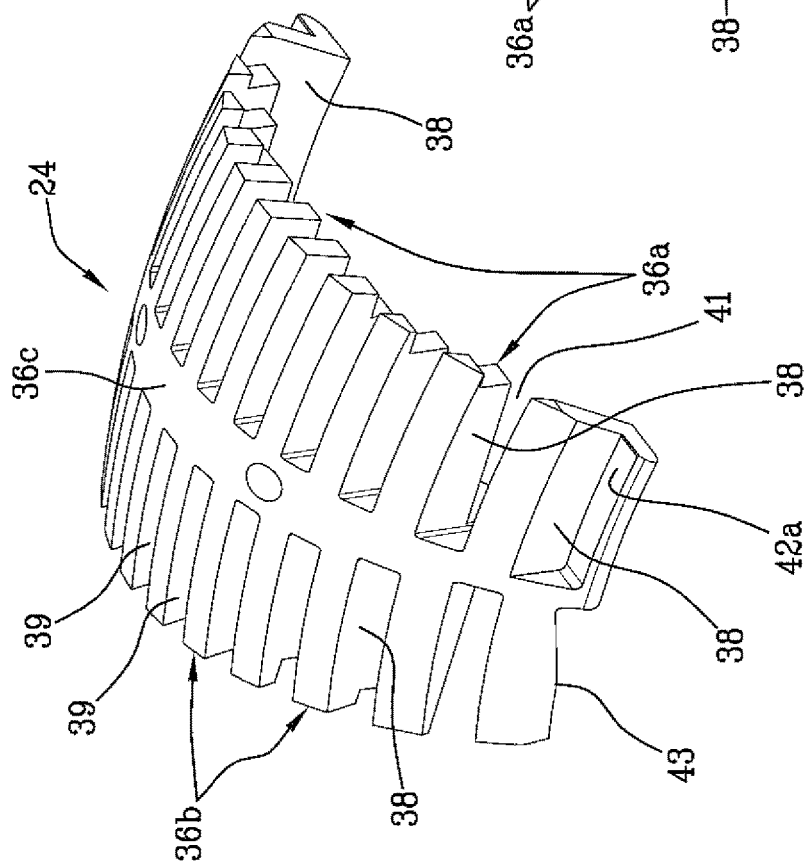

EXPANDABLE FORMING DRUM, AND PROCESS FOR BUILDING TYRES

CROSS REFERENCE TO RELATED APPLICATIONS

This application is a national phase application based on PCT/IB2014/067210, filed Dec. 22, 2014, and claims the priority of Italian Patent Application No. MI2013A002186, filed Dec. 23, 2013, the content of each application being incorporated herein by reference.

BACKGROUND OF THE INVENTION

Field of the Invention

The present invention relates to a forming drum, and a process for building tyres for vehicle wheels.

More particularly, the invention is directed for the building of green tyres, to be subsequently subjected to a vulcanisation cycle for obtaining the final product.

Description of the Related Art

For the purpose of the present description, with the term "elastomeric material" it is intended to indicate a composition comprising at least one elastomeric polymer and at least one reinforcement filler. Preferably, such composition further comprises additives such as, for example, a cross-linking agent and/or a plasticiser. Due to the presence of the cross-linking agent, via heating, such material can be cross-linked, so as to form the final manufactured product.

By "tyre for two-wheel vehicles", in particular motorcycles, it is intended a tyre whose curvature ratio is as an example comprised between about 0.15 and about 0.45.

By "curvature ratio" relative to a tyre (or to a portion thereof) it is intended the ratio between the distance of the radially external point of the tread band (or of the external surface) from the line passing through the laterally opposite ends of the tread itself (or of the external surface itself), measured on a radial plane of the tyre (or of said portion thereof), and the distance measured along the chord of the tyre (or a portion thereof) between said ends.

By "curvature ratio" relative to a forming drum it is intended the ratio between the distance of the radially external point of the external surface of the drum from the line passing through the laterally opposite ends of the drum itself, measured on a radial plane of the drum, and the distance measured along the chord of the drum between said ends.

The terms "radial" and "axially" and the expressions "radially internal/external" and "axially internal/external" are used with reference to the radial direction of the forming drum used/of the tyre (i.e. to a direction perpendicular to the rotation axis of the aforesaid forming drum/tyre) and to the axial direction of the forming support used/of the tyre (i.e. to a direction parallel to the rotation axis of the aforesaid forming drum/tyre). The terms "circumferential" and "circumferentially" are instead used with reference to the annular extension of the aforesaid forming support/tyre. A plane with respect to a forming drum or to a tyre is defined "radial" when it contains the rotation axis of the forming drum or of the tyre, respectively. By "elementary semi-finished product" it is intended a continuous elongated element made of elastomeric material. Preferably such continuous elongated element can comprise one or more textile and/or metallic cords. Preferably such continuous elongated element can be cut to size.

By "component" or "structural component" of a tyre it is intended any one portion thereof capable of carrying out its own function or a part thereof. For example, components of the tyre include the liner, the under-liner, the sidewall inserts, the bead cores, the filler inserts, the anti-abrasive, the sidewalls, the carcass ply/plies, the belt layer(s), the tread band, the underlayer of the tread band, the under-belt inserts etc.

A tyre for vehicle wheels generally comprises a carcass structure comprising at least one carcass ply having respectively opposite ends engaged with respective annular anchoring structures, integrated in the zones normally identified with the name of "beads", having an internal diameter substantially corresponding with a so-called "fitting diameter" of the tyre on a respective mounting rim.

The carcass structure is associated with a belt structure which can comprise one or more belt layers situated in radial superimposition with respect to each other and with respect to the carcass ply, having textile or metallic reinforcement cords with crossed orientation and/or substantially parallel to the circumferential extension direction of the tyre (at 0 degrees). In radially external position with respect to the belt structure, a tread band is applied, it too made of elastomeric material like other semi-finished products constituting the tyre.

Respective sidewalls made of elastomeric material are also applied in axially external position on the lateral surfaces of the carcass structure, each extended from one of the lateral edges of the tread band up to the respective annular anchoring structure to the beads. In the tyres of "tubeless" type, an air-impermeable covering layer, normally termed "liner", covers the internal surfaces of the tyre.

Following the building of the green tyre, actuated by means of the assembly of respective components, a moulding and vulcanisation treatment is generally executed, aimed to determine the structural stabilisation of the tyre by means of cross-linking of the elastomeric compositions as well as to impart on the same, if requested, a desired tread pattern and possible distinctive graphic marks at the sidewalls of the tyre.

The carcass structure, generally in sleeve form, and the belt structure are generally made separately from each other in respective work stations, in order to be mutually assembled at a later time.

WO 2004/041520, on behalf of the same Applicant, describes a shaping drum carried by a robotic arm which interacts with a transfer member carrying the belt structure picked up by an auxiliary drum, in order to determine the coupling between the carcass structure and the belt structure. The robotic arm then carries the shaping drum in proximity to devices for applying the tread band and/or the sidewalls comprising dispensing members arranged to deposit a continuous elongated element made of elastomeric material on the mutually coupled carcass structure and belt structure.

The document WO 2004/041522 illustrates a further embodiment in which a shaping drum carried by a robotic arm is moved in order to interact with devices that complete the manufacturing of the green tyre after having determined the application of a belt structure previously formed on an auxiliary drum.

US 2009/0020200 describes the manufacturing of a tyre for two-wheel vehicles, in which a tread band is obtained by continuously winding as a spiral a continuous elongated element made of elastomeric material in the circumferential direction of the tyre being processed, supported by a rigid drum whose external surface profile mirrors the internal surface profile of the tyre being processed.

US 2013/0075041 proposes applying the crown structure of a tyre on a carcass structure shaped and supported by a forming drum arranged at its interior. The forming drum has a pair of bead grip half-parts, radially expandable for determining the engagement of the carcass structure, which is shaped according to a shape very close to the structure of a finished tyre, with a mutual approaching of the half-parts themselves. Also present in the drum is a central forming unit having two series of forming plates which in an expanded condition mutually mate in order to define a continuous 360° surface that supports the carcass structure. The plates belonging to one series and the other are mutually alternated and in a contracted condition the plates of one series radially translate inside the plates of the second series.

SUMMARY OF THE INVENTION

The Applicant proposes significantly improving the quality of the product by optimizing the deposition of single components of the tyre for the purpose of building the same.

For such purpose, the Applicant has observed that by depositing an elementary semi-finished product fed by a dispenser directly onto the toroidal forming drum, while the latter is suitably moved at the dispenser itself, it is possible to very precisely distribute the elementary semi-finished product so as to form a desired structural component of the tyre (e.g. a belt layer, a tread band or a sidewall) with greater precision than that normally attainable when conventional semi-finished products are used with pieces cut to size.

Nevertheless, the Applicant has perceived that the actuation of these principles on an expandable drum, as for example described in US 2013/075041, would be precluded, or at least obstructed, by the current impossibility of arranging a drum sufficiently light and manageable for the purpose of its transfer and movement in one or more work stations set to form the single components.

For such purpose, the Applicant has observed that the use of plates with continuous abutment surface obliges the subdivision of the plates into two separate series, separately movable at respective subsequent moments, in order to prevent mutual interference and jamming during the contraction and expansion of the drum. Consequently, complex driving mechanisms are required, which considerably increase the overall weight of the drum. The need to separately move the plates, carrying a series of plates inside the other in the contracted condition, also makes it difficult to confer a diameter size to the drum that is sufficiently limited in the contracted condition.

The Applicant has perceived the possibility to attain a significant lightening of the drum if in place of a continuous abutment surface, even if apparently optimal for the purpose of manufacturing the tyre components, sectors are used that are mutually interconnected at respectively complementary cavities. According to the Applicant, the lightening will not be due exclusively to the lower weight determined by the lack of material at the cavities, but also and above all due to a simplification of the driving mechanisms and overall structure of the drum, since it will be possible to contract and expand the drum with a simultaneous movement of all the sectors present.

The Applicant however observes that a correct application of the elementary semi-finished products on the forming drum cannot occur without thrust actions transmitted, e.g. by rollers or other applicator members, on the elementary semi-finished product in the direction of the abutment surface. According to the perception of the Applicant, in this circumstance the presence of the surface discontinuities determined by the cavities on the abutment surface could cause sudden and uncontrolled variations of the stresses transmitted by the elementary semi-finished product during the application, with consequent risk of deformation, damage or breakage of the elementary semi-finished products themselves during deposition.

The Applicant has moreover perceived that the risks of deformation or breakage of the elementary semi-finished products during deposition can be effectively limited or eliminated by suitably modulating the size and geometric distribution of the cavities on the abutment surface.

In particular, the Applicant has found that, for the purpose of a correct deposition of the elementary semi-finished products, it is advantageous to manage the distribution of the cavities in a manner such that, at the axially opposite circumferential edges of the abutment surface, the transverse width of the solid portions of the abutment surface is suitably limited.

More particularly, according to a first aspect, an expandable toroidal forming drum for building tyres forms the object of the present invention.

Preferably circumferentially consecutive sectors are provided that are radially moveable between a contracted condition in which said sectors are approached with respect to a geometric rotation axis of the forming drum, and an expanded condition in which the sectors are radially moved away from said geometric axis in order to define a radially external abutment surface.

Preferably, in the expanded condition, the abutment surface has circumferential rows of solid portions alternated with hollow portions.

Preferably, the solid portions arranged along axially opposite circumferential edges of the abutment surface, have a transverse size comprised between 10% and 60% of a transverse size presented by the solid portions arranged in proximity to an axial centreline plane of the abutment surface.

In accordance with a second aspect, the invention relates to a process for building tyres.

Preferably provision is made for building a carcass sleeve.

Preferably provision is made for shaping said carcass sleeve according to a toroidal configuration.

Preferably provision is made for engaging a toroidal forming drum within the shaped carcass sleeve, for supporting the carcass sleeve against an abutment surface externally provided by the forming drum.

Preferably provision is made for applying at least one elementary semi-finished product of said tyre around the shaped carcass sleeve, by pressing said elementary semi-finished product towards the abutment surface.

Preferably said abutment surface has circumferential rows of solid portions alternated with hollow portions.

Preferably the solid portions arranged along axially opposite circumferential edges of the abutment surface, have a transverse size comprised between 10% and 60% of a transverse size presented by the solid portions arranged in proximity to an axial centreline plane of the abutment surface.

The Applicant has observed that during the execution of the spiraling, when the drum is supported and suitably moved in order to manage the distribution of the elementary semi-finished products, the thrust action exerted for example by an applicator roller tends to push the elementary semi-finished product together with the underlying parts of the carcass structure into the hollow portions of the abutment surface, towards the interior of the corresponding cavities. The Applicant has also perceived that while, in the axially internal zones of the abutment surface, the structural consistency of the carcass structure is able to sufficiently resist the penetration into the cavity, this may not occur with the same effectiveness in proximity of the axially external zones, which lie on the axially opposite edges of the abutment surface. The Applicant has in fact observed that in the axially internal zones, the carcass structure abuts against two axially contiguous solid portions of the abutment surface, substantially acting like a bridge-like beam between two supports, which resists the bending towards the interior of the underlying hollow portion. At the axially opposite circumferential edges of the drum, however, the carcass structure projects cantilevered from the abutment surface and therefore one of the abovementioned supports comes to be lacking. The thrust exerted by the applicator roller thus tends to deform the carcass structure, making it "sink" into the cavities encountered on the abutment surface during the application. The roller or other applicator member consequently tends to impact against the edges of the solid portions progressively encountered along the circumferential extension of the abutment surface, generating irregular and discontinuous stresses that can damage the structural components of the tyre during manufacturing and make it extremely difficult if not impossible to execute the spiraling. This circumstance is more evident in the processing of tyres with a high curvature ratio, typically seen for example in tyres for motorcycles or other two-wheel vehicles. In a forming drum with high curvature ratio, indeed, the abutment surface has, at a given radial plane, a continuous variable orientation from the zones close to the axial centreline plane of the drum, where the abutment surface is substantially parallel to the rotation axis thereof, to close to the axially opposite edges of the abutment surface, where the orientation of the latter is significantly tilted towards a substantially radial direction. Consequently, the cavities closest to the axially opposite edges of the forming drum generate, on the abutment surface, hollow portions of greater size than that generated by cavities of equal axial size, close to the axial centreline plane.

The Applicant deems that by conferring a limited transverse size to the solid portions defining the axially opposite edges of the abutment surface it is possible to ensure a correct application of the elementary semi-finished products, even when such application is executed by spiraling the same on the carcass structure supported by the forming drum.

In at least one of the aforesaid aspects, the invention comprises one or more of the following preferred characteristics that are described hereinbelow.

Preferably, the solid portions arranged along axially opposite circumferential edges of the abutment surface have a transverse size comprised between 20% and 50% of a transverse size presented by the solid portions arranged in proximity to an axial centreline plane of the abutment surface.

Preferably, the transverse size of the solid portions is detectable in a radial plane of the forming drum.

Preferably, each sector has circumferentially opposite coupling portions, each comprising elongated projections alternated with circumferentially extended cavities, in which the projections of each sector are slidably engaged in the respective cavities of circumferentially adjacent sectors.

Preferably, said solid portions and hollow portions are respectively defined on said projections and by said cavities.

Preferably, each of said cavities is axially delimited between lateral walls of two axially consecutive projections.

Preferably, at least some of said projections have substantially plate-like structure and lie according to planes parallel to a circumferential extension direction of the abutment surface.

Preferably, said lateral walls are extended according to planes substantially perpendicular to a geometric rotation axis of the forming drum.

Preferably, at least some of said cavities are axially delimited, each between the lateral walls of two axially consecutive projections.

Preferably, in each sector, projections belonging to one of said coupling portions are offset with respect to the projections belonging to the other coupling portion.

Preferably, axially terminal cavities arranged along the axially opposite circumferential edges of the abutment surface are each delimited (for example in a radial section plane of the forming drum), between a base surface and a lateral wall respectively converging, both carried by an axially terminal projection arranged along said circumferential edge.

Preferably, said lateral wall is oriented according to a plane substantially perpendicular to the geometric rotation axis of the forming drum.

Preferably, said base surface is oriented in a manner substantially parallel to the geometric rotation axis of the forming drum.

Preferably, first axially terminal projections arranged along the axially opposite circumferential edges of the abutment surface are interconnected, substantially on the entire length, each with an axially adjacent projection.

Preferably, first axially terminal projections arranged along the axially opposite circumferential edges of the abutment surface each have (for example in a radial section plane of the forming drum), a base surface converging with respect to a lateral wall of a axially adjacent projection, for delimiting one of said cavities between two solid portions of the axially contiguous abutment surface.

Preferably, second axially terminal projections arranged along the axially opposite circumferential edges of the abutment surface each have a respectively converging base surface and a lateral wall, delimiting a respective solid portion of the abutment surface.

Preferably, second axially terminal projections arranged along the axially opposite circumferential edges of the abutment surface each have, at the respective base surface, a substantially arched longitudinal edge, still more preferably convex.

Preferably, in the contracted condition, the projections are inserted in the cavities according to a measure at least equal to 80% of their length.

Preferably, in the expanded condition the projections are extracted from the cavities according to a measure at least equal to 80% of their length.

Preferably, at least in proximity to an axial centreline plane ("E") of the forming drum (23), each projection has an axial size comprised between about 4 mm and about 15 mm.

Preferably, the hollow portions in the expanded condition have a circumferential size comprised between about 30 mm and about 60 mm.

Preferably, radial movement devices are provided for simultaneously moving the sectors between the contracted condition and the expanded condition.

Preferably, said radial movement devices comprise transmission mechanisms operatively engageable by actuator devices and configured for simultaneously translating the sectors from the contracted condition to the expanded condition.

Preferably, said transmission mechanisms comprise driving levers each hinged to one of said sectors and to at least one driving collar slidably fit along a central shaft.

Preferably, the driving collar is operatively connected to a threaded bar rotatably engaged in the central shaft.

Preferably, two driving collars are provided that are slidably engaged on the central shaft in axially opposite positions with respect to the sectors, and engaging the threaded bar at respective right hand and left hand threads.

Preferably, the sectors are carried by respective telescopically extendable guide members, radially extending from a central shaft.

Preferably, the forming drum has, in expanded condition, a curvature ratio comprised between about 0.15 and about 0.45.

Preferably deposition devices are provided for applying one or more elementary semi-finished products in radially external position with respect to said abutment surface.

Preferably, said deposition devices comprise a driving unit for driving in rotation the forming drum around its geometric rotation axis and at least one applicator member for at least one elementary semi-finished product at said abutment surface.

Preferably, said applicator member comprises at least one idle roller operating on the elementary semi-finished product in a thrust relation towards the abutment surface.

Preferably, said forming drum is removably engageable in a shaping station comprising engagement devices for engaging a carcass sleeve coaxially around the forming drum.

Preferably, shaping devices are also provided, operating in the shaping station for shaping the carcass sleeve according to a toroidal configuration.

Preferably, actuator devices are provided, operating in the shaping station for radially expanding the forming drum within the carcass sleeve.

Preferably, the actuator devices comprise a rotary driving device operatively engageable with the threaded bar at a first end of the central shaft.

Preferably, said deposition devices operate in at least one belt structure application station.

Preferably, said deposition devices operate in at least one tread band application station.

Preferably, the following are provided:
a carcass building line;
carcass loading devices configured for transferring the carcass sleeve from the carcass building line to the shaping station.

Preferably, the hollow portions of each circumferential row are circumferentially offset with respect to the hollow portions of axially adjacent circumferential rows.

Preferably, said carcass sleeve comprises at least one carcass ply and a pair of annular anchoring structures engaged at axially opposite ends of said at least one carcass ply Preferably, the carcass sleeve engaged with the forming drum has axially opposite terminal flaps projecting cantilevered with respect to the abutment surface.

Preferably, the elementary semi-finished product is applied according to axially contiguous circumferential coils, in order to form a component of said tyre.

Preferably, the elementary semi-finished product is pressed against the abutment surface by a localised thrust action against a surface portion of said elementary semi-finished product.

Preferably, the thrust action is exerted by pressing an applicator roller against the elementary semi-finished product while the forming drum rotates around a geometric rotation axis thereof.

Preferably, the elementary semi-finished product is pressed by a localised thrust action in an action area having transverse size smaller than the transverse size of the hollow portions.

Preferably, the transverse size of the action area is measurable against the abutment surface in a radial plane of the forming drum.

Further characteristics and advantages will be clearer from the detailed description of a preferred but not exclusive embodiment of a forming drum, and a process for building tyres, in accordance with the present invention.

BRIEF DESCRIPTION OF THE DRAWINGS

Such description will be set forth hereinbelow with reference to the enclosed drawings, provided only for exemplifying and hence non-limiting purposes, in which:

FIG. 3a shows an enlargement of the detail indicated with "A" in FIG. 3;

FIG. 5 shows, in perspective view, several sectors of a forming drum in a contracted condition;

FIG. 6 shows the sectors of FIG. 5 in an expanded condition;

FIGS. 7 and 8 show a single sector of the forming drum seen in perspective view from respectively opposite angles;

DETAILED DESCRIPTION OF THE INVENTION

With reference to the abovementioned figures, reference number 1 indicates overall a plant for building tyres for vehicle wheels. The plant 1 is arranged to actuate a process according to the present invention.

Figure 11:
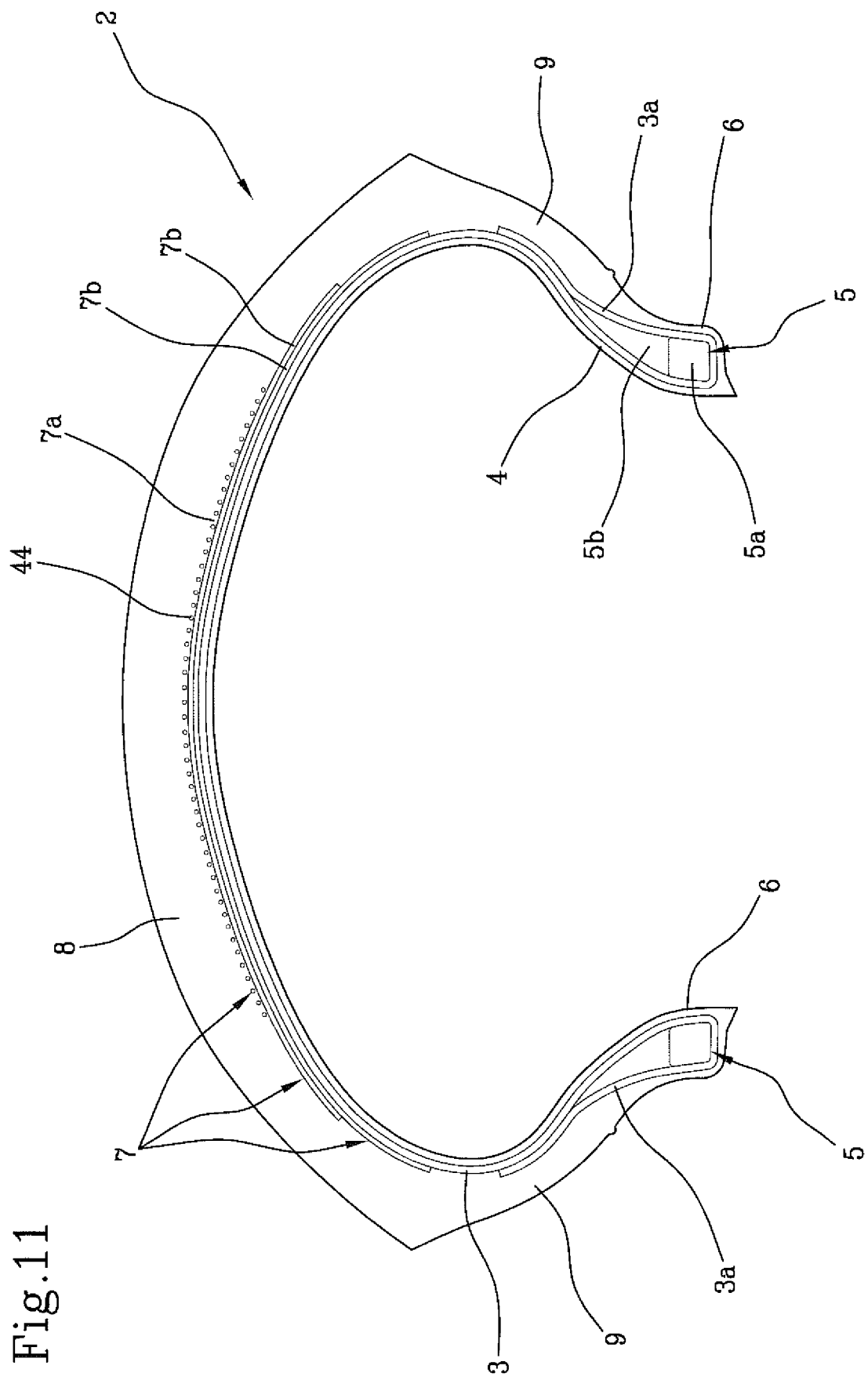
FIG. 11 schematically shows, in radial half-section, a tyre obtainable in accordance with the present invention.

The plant 1 is set for manufacturing tyres 2 (FIG. 11) essentially comprising at least one carcass ply 3 preferably internally covered by a layer of impermeable elastomeric material or so-called liner 4. Two annular anchoring structures 5, each comprising a so-called bear core 5a preferably carrying an elastomeric filler 5b in radially external position, are engaged at respective ends 3a of the carcass ply/plies 3. The annular anchoring structures 5 are integrated in proximity to zones normally identified with the term "beads" 6, at which the engagement between the tyre 2 and a respective mounting rim (not depicted) normally occurs.

A belt structure 7 is circumferentially applied around the carcass ply/plies 3, and a tread band 8 is circumferentially superimposed on the belt structure 7. Two sidewalls 9, each extended from the corresponding bead 6 to a corresponding lateral edge of the tread band 8, are applied in laterally opposite positions on the carcass ply/plies 3.

The plant 1 comprises a carcass building line 10 having one or more building positions 11 where the manufacturing of a carcass sleeve 12, having substantially cylindrical shape, is executed for example according to known modes. The carcass sleeve 12 comprises said at least one carcass ply 3, preferably internally covered by the liner 4, and having respective axially opposite edges ends 3a engaged, for example by turning up, with the respective annular anchoring structures 5. If necessary, the carcass sleeve 12 can also comprise the sidewalls 9 or first portions thereof, each extended starting from a respective bead 6.

The carcass building line 10 leads to a shaping station 13 comprising devices 14 for engaging the carcass sleeve 12 and shaping devices 15, upon whose action the carcass sleeve 12 is shaped according to a toroidal configuration.

The engagement devices 14 for example comprise a first flange element 16a and a second flange element 16b, coaxially facing each other and having respective circumferential engagement seats 17a, 17b, by means of which they are each operatively engageable at one of the annular anchoring structures 5 respectively carried by the axially opposite ends of the carcass sleeve 12.

The engagement devices 14 can also comprise axial movement members 18 of the flange elements 16a, 16b. More in detail, it can be provided that at least one of the flange elements 16a, 16b, for example the first flange element 16a, is carried by a carriage 19 movable along one or more linear guides 20, parallel to a geometric axis X-X of mutual alignment between the flange elements 16a, 16b and preferably integral with respect to a fixed base 21, carrying the second flange element 16b. The movement of the carriage 19 along the linear guides 20 determines the switching of the shaping station 13 between a loading/unloading condition and a work condition. In the loading/unloading condition (FIG. 2), the first flange element 16a is spaced from the second flange element 16b according to a greater measure, approximately at least double, with respect to an axial size of the non-shaped carcass sleeve 12, coming from the carcass building line 10. In the work condition, the flange elements 16a, 16b, and more precisely the respective circumferential engagement seats 17a, 17b thereof, are mutually spaced according to a measure substantially corresponding to the axial size of the carcass sleeve 12.

The shaping devices 15 can for example comprise a fluid-dynamic circuit (not shown) for introducing pressurised air or another operative inflation fluid between the flange elements 16a, 16b, inside the carcass sleeve 12.

The shaping devices 15 can also comprise one or more linear actuators or other axial movement devices 22, operating on one or preferably both the flange elements 16a, 16b in order to move them axially towards each other starting from the aforesaid work condition. The mutual approaching of the flange elements 16a, 16b causes a mutual approaching of the anchoring annular structures 5 so as to allow the shaping of the carcass sleeve 12 according to a toroidal configuration, assisted by the simultaneous introduction of the pressurised operative fluid into the carcass sleeve 12.

In the shaping station 13, the shaped carcass sleeve 12 is coupled to a toroidal forming drum 23, substantially rigid and expandable, arranged inside the carcass sleeve itself.

In FIGS. 1 to 4, the forming drum 23 is only schematically displayed, while in FIGS. 5 to 10 it is depicted in greater detail.

The forming drum 23 is expandable between a radially contracted condition (FIGS. 2 and 3 and 5), and a radially expanded condition (FIGS. 4, 6, 9 and 10). For such purpose, the forming drum 23 comprises a plurality of sectors 24 circumferentially distributed around a central shaft 25. The sectors 24 are movable upon action of radial movement devices 35, preferably simultaneously with each other, from the aforesaid contracted condition in which they are close to the central shaft 25, to the expanded condition in which said sectors 24 are moved away from the central shaft 25. For such purpose, it can be provided that the sectors 24 are carried by respective telescopically extendable guide members 26, radially extending from the central shaft 25.

Preferably, the contracted condition and expanded condition of the sectors 24 respectively correspond with a maximum radial contraction condition and a maximum radial expansion condition of the forming drum 23.

The movement of the sectors 24 can be attained by means of transmission mechanisms 27 comprising for example driving levers 28 that are hinged, each at the respectively opposite ends thereof, to one of said sectors 24 and to at least one driving collar 29 slidably fit along the central shaft 25.

More particularly, a pair of driving collars 29 are preferably provided, situated along the central shaft 25 in axially opposite positions with respect to the sectors 24, each engaging respective driving levers 28.

Each driving collar 29 is operatively connected to a threaded bar 30, rotatably engaged coaxially inside the central shaft 25. The threaded bar 30 is extended along the central shaft 25, nearly for the entire length thereof or beyond, and carries two axially opposite threads 30a, 30b, respectively right hand and left hand. Operatively engaged on the threads 30a, 30b are respective nut screws 31, axially movable inside the central shaft 25 and each connected to one of the driving collars 29, e.g. by means of at least one block 32 radially traversing the central shaft 25 at a longitudinal slit 33.

The rotation of the threaded bar 30 in the central shaft 25, actuatable by means of a rotary driving device 34 or actuator devices of another type operating in the shaping station 13, causes an axial movement of the nut screws 31 and the driving collars 29, to which a radial movement of the sectors 24 corresponds, towards the contracted condition or the expanded condition in accordance with the rotation sense of the threaded bar 30.

In the expanded condition, the set of sectors 24 of the forming drum 23 defines, along the circumferential extension thereof, a radially external abutment surface "S", toroidally shaped according to the internal configuration that a part of the carcass sleeve 12 must assume upon completed shaping. More in detail, it can advantageously be provided that the abutment surface "S" of the forming drum 23 in the expanded condition has a curvature ratio comprised between about 0.15 and about 0.45, typically adapted for obtaining tyres for motorcycles or other two-wheel vehicles. If necessary, however, curvature ratios can be employed of values lower than those indicated above, for example adapted for producing tyres for cars or trucks.

As illustrated in FIGS. 7 and 8, each of the sectors 24 has circumferentially opposite coupling portions 36a, 36b, preferably interconnected by means of an intermediate portion 36c which has, at least on the abutment surface "S", a main extension direction parallel to a radial plane of the forming drum 23. In FIGS. 1 to 4, the geometric axis of the drum coincides with the geometric axis X-X.

Each of the coupling portions 36a, 36b has a plurality of elongated projections 37 extended in circumferential direction from the intermediate portion 36c, alternated with respective circumferentially extended cavities 39.

In a same sector 24, the projections 37 belonging to one of the coupling portions, for example 36a, are offset with respect to the projections 37 of the other coupling portion 36b.

At least one part of the projections 37, more precisely at least the projections 37 situated at the axially internal zones of the drum, or not situated along the axially opposite circumferential edges thereof, can have substantially plate-like structure, and lie according to planes parallel to a circumferential extension direction of the abutment surface "S". Such projections 37 therefore have lateral walls 38 extended according to planes orthogonal to the geometric rotation axis of the drum.

At least the cavities 39 situated at the axially internal zones of the drum, or not situated at the axially opposite circumferential edges thereof, are axially delimited, each between lateral walls 38 of two axially consecutive projections 37.

As is better illustrated in FIGS. 5 and 6, the projections 37 of each sector are slidably engaged in the respective cavities 39 of the circumferentially adjacent sectors 24, and are adapted to slide in the cavities themselves in order to support the expansion and contraction movements of the forming drum 23.

The lateral walls 38 of the respectively mating projections 37 belonging to circumferentially contiguous sectors 24 mutually guide the sectors themselves during the contraction and expansion movement, and facilitate the maintenance of a satisfactory structural solidity of the forming drum 23 overall, both in the contracted condition and in the expanded condition.

In the contracted condition, the projections 37 of each sector 24 penetrate into the respective cavities 39 until they touch or nearly touch the intermediate portion 36c of the adjacent sector 24. More particularly, in the contracted condition, the projections 37 are inserted in the respective cavities 39 according to a measure at least equal to 80% of their length.

In the expanded condition, the projections 37 are extracted from the cavities 39 according to a measure at least equal to 80% of their length.

The presence of the projections 37, of the cavities 39 and their mutual relation ensure that, on the abutment surface "S", circumferential rows of solid portions 40 are identifiable, at least in the expanded condition, defined by the projections 37, alternated with hollow portions 41 defined by the cavities 39. The solid portions 40 and hollow portions 41 belonging to each circumferential row are circumferentially offset with respect to the solid portions 40 and, respectively, hollow portions 41 of axially adjacent circumferential rows.

It is opportune that the surface discontinuities induced by the alternation of solid portions 40 and hollow portions 41 does not compromise a correct execution of the obtainment of the tyre 2 components during building. For such purpose, it is preferably provided that at least in proximity to an axial centreline plane "E" of the forming drum 23, still more preferably over all the projections 37 except for those situated along the axially opposite circumferential edges of the forming drum 23, each projection 37 has axial size approximately comprised between about 4 mm and about 15 mm, preferably equal to about 8 mm. Each cavity 39 has preferably axial size equal to that of the projections 37 circumferentially aligned therewith.

Axial size larger than the indicated values could be excessive for the purpose of a correct support of the carcass sleeve 12 and/or of other components of the tyre 2, also in consideration of the stresses transmitted during processing. Axial size smaller than the indicated values could in turn lead to excessive structural complexity of the sectors 24, with consequent increase in the production costs, in addition to possible structural weakening.

It is also preferably provided that the hollow portions 41 in the expanded condition have a circumferential size comprised between about 30 mm and about 60 mm, preferably equal to about 40 mm.

At the axially opposite circumferential edges of the abutment surface "S", the axial size of the projections 37 and cavities 39 indicated above can be excessive for the purpose of a correct processing.

For such purpose, it should be observed that due to the curvature provided by the cross section profile of the abutment surface "S", the transverse size of the solid portions 40 and hollow portions 41 is not equal to the axial size of the corresponding projections 37 and cavities 39 to which they belong. In particular, in the forming drums intended for obtaining tyres for two-wheel vehicles, where the curvature ratio is relatively accentuated, the transverse size of the solid portions 40 and hollow portions 41 at the axially opposite circumferential edges can be several times larger than that which can be encountered in proximity to the axial centreline plane "E".

Consequently the axially opposite terminal flaps 12a of the carcass sleeve 12, projecting cantilevered from the opposite circumferential edges of the abutment surface "S", can be overly weak and freely movable for the purpose of opposing the stresses.

It is therefore preferable that the axial size of the projections 37 and cavities 39 at the axially opposite circumferential edges of the abutment surface "S" are different from those detectable in the remaining axial more internal portions of the forming drum 23. More particularly, the sizing of the projections 37 and cavities 39 is selected and modulated on the width of the abutment surface "S", in a manner such that the circumferential rows of solid portions 40 defining axially opposite circumferential edges of the abutment surface "S", or arranged in proximity of the same edges, have a transverse size "T1" approximately comprised between 10% and 60%, more preferably between 20% and 50%, of a transverse size T2 presented by the circumferential rows of solid portions 40 arranged in proximity to an axial centreline plane of the abutment surface "S". Such transverse size is detectable along the profile of the abutment surface "S", in a radial plane of the forming drum 23, and in the described embodiment can assume, at the axially opposite circumferential edges of the abutment surface "S", a value on the order of about 2 mm.

Values lower than the indicated minimum thresholds could induce excessive localised stresses, in particular on the elastomeric components radially facing towards the tyre 2 interior, directly in contact on the abutment surface "S". Values greater than the indicated maximum thresholds could excessively reduce the effect of a suitable support for the terminal flaps 12a of axially opposite ends of the carcass sleeve 12.

It is thus possible to suitably limit the cantilever according to which the axially opposite terminal flaps 12a of the carcass sleeve 12, carrying the beads 6, project with respect to the abutment surface "S". In other words, notwithstanding the discontinuities provided by the abutment surface "S", the axial ends of the sleeve 6 are suitably supported for the purpose of the subsequent obtainment of the components of the tyre 2, as will be better described hereinbelow.

It is preferably provided that the axially terminal projections, identified with 37a, 37b arranged along the axially opposite circumferential edges of the abutment surface "S", are interconnected substantially along the entire length thereof detectable in the circumferential direction, with the axially adjacent projections 37 belonging to the same coupling portion 36a, 36b.

More particularly, in the coupling portions 36a, 36b of each sector 24, a first axially terminal projection 37a and a second axially terminal projection 37b are respectively identifiable, along each of the axially external circumferential edges. The first axially terminal projection 37a has, in a radial section plane of the forming drum 23, a base surface 42a converging with respect to the lateral wall 38 of an axially adjacent projection 37, preferably at right angle, so as to delimit one of said cavities 39, identified here as axially terminal cavity 39a, between two of the axially contiguous solid portions 40 of the abutment surface "S".

The second axially terminal projection 37b, substantially complementary to the axially terminal cavity 39a, in turn has a base surface 42b and a lateral wall 38 respectively converging, preferably at right angle, delimiting a respective solid portion 40 of the abutment surface "S". More particularly, the lateral wall 38 is preferably oriented according to a plane perpendicular to the geometric rotation axis of the forming drum 23. The base surface 42b can in turn be oriented parallel to the geometric rotation axis of the forming drum 23.

In passing from the expanded condition to the contracted condition, the sectors 24 simultaneously translate towards the geometric rotation axis of the forming drum 23, mutually approaching each other according to a substantially circumferential direction. In order to support such mutual movement without jamming due to mechanical interferences, it is preferably provided that the second axially terminal projections 37b each have, at the respective base surface 42b, a convex longitudinal edge 43, extended according to a substantially arched profile.

Preferably, the forming drum 23 is positioned in the shaping station 13 before the respective carcass sleeve 12, e.g. still being processed along the carcass building line 10, reaches the shaping station itself.

More particularly, it is preferably provided that the forming drum 23 be supported cantilevered in the shaping station 13. For example, a first end, 25a of the central shaft 25 of the forming drum 23 can for such purpose be retained by a mandrel 44 coaxially housed in the first flange element 16a and carrying the aforesaid rotary driving device 34 couplable with the threaded bar 30 in order to drive it in rotation.

The forming drum 23 can therefore be arranged in the contracted condition by means of said rotary driving device 34, if it is not already situated in such condition upon reaching the shaping station 13.

By means of carcass loading devices 45, the carcass sleeve 12 coming from the carcass building line 10 is then transferred into the shaping station 13 in order to be subsequently coaxially arranged in radially external position around the forming drum 23 arranged in the contracted condition.

Figure 1:
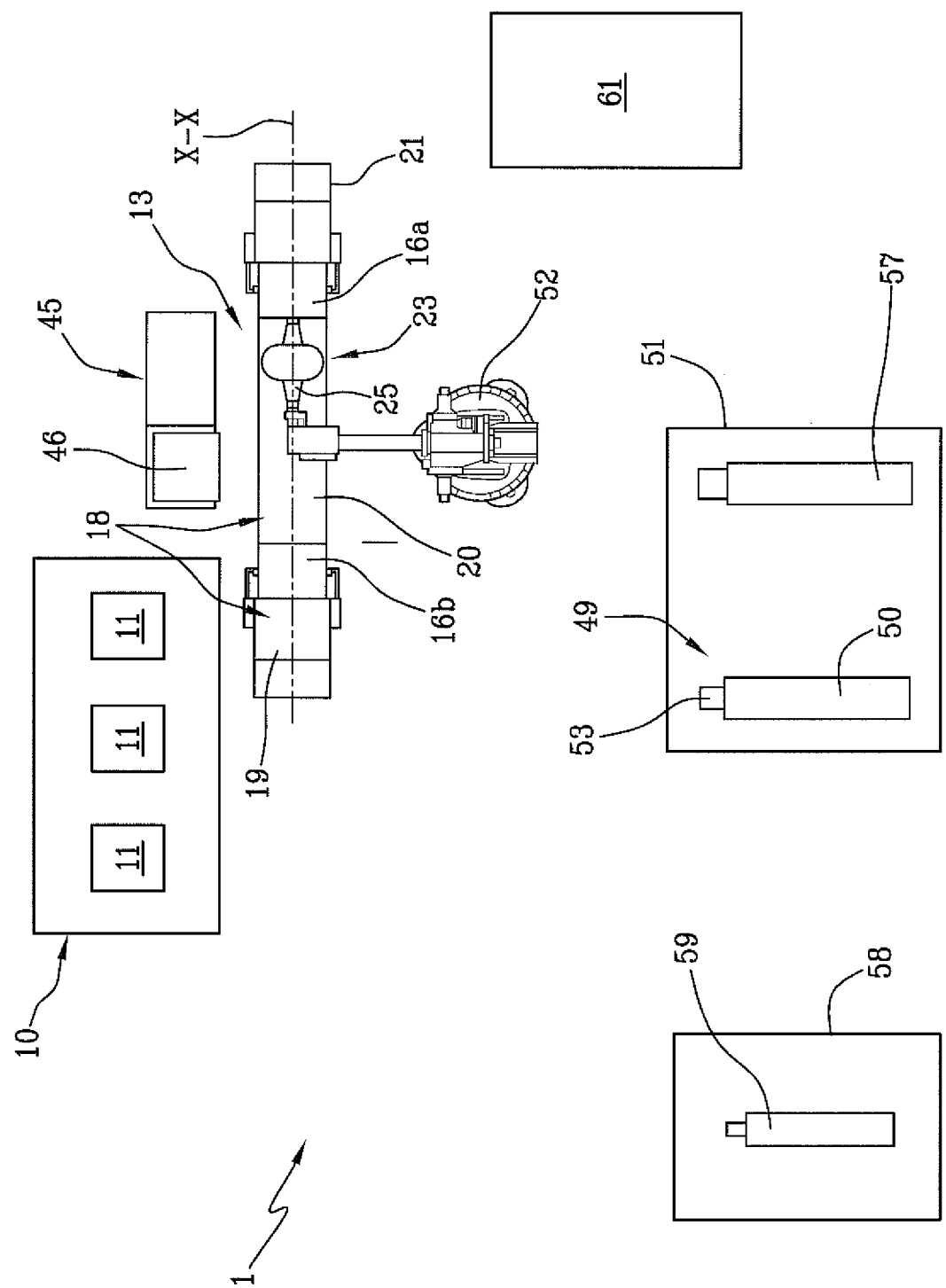
FIG. 1 schematically shows a top view of a plant for building tyres.
Figure 2:
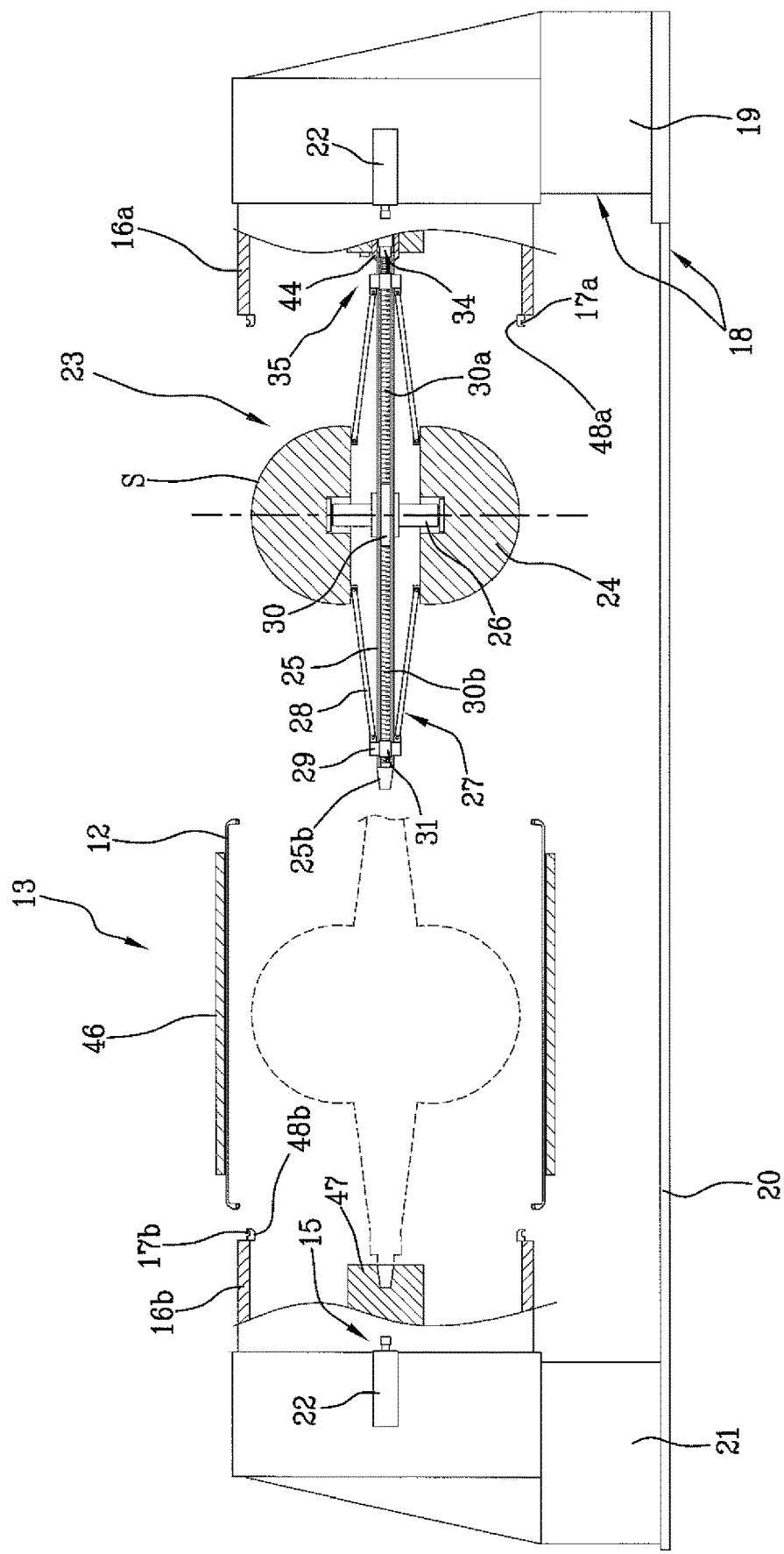
FIG. 2 schematically shows, in side view and partial section, the loading of a carcass sleeve on a shaping station.
Figure 3:
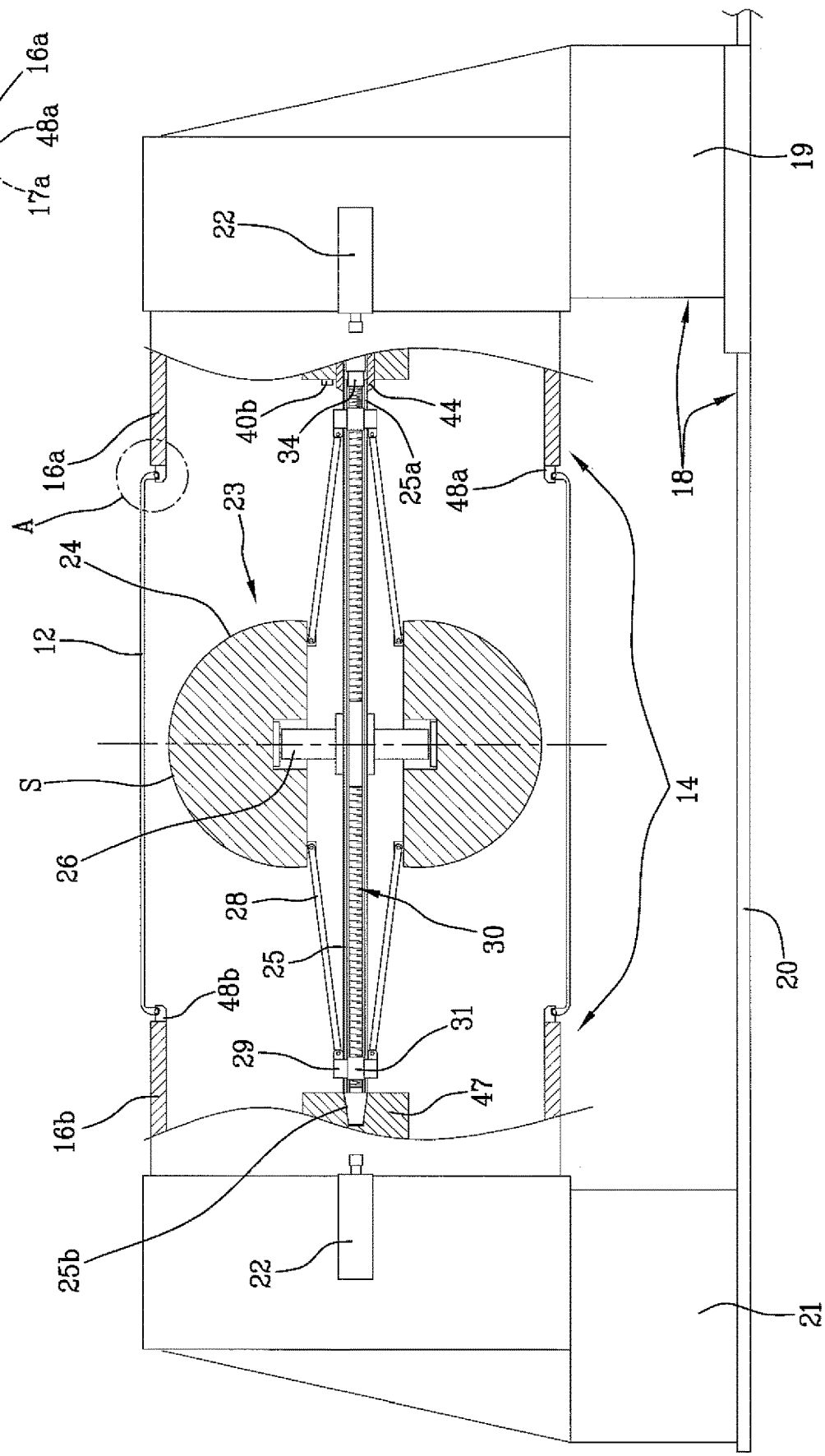
FIG. 3 schematically shows, in side view and partial section, the engagement of the carcass sleeve with shaping devices arranged in the shaping station.
Figure 4:
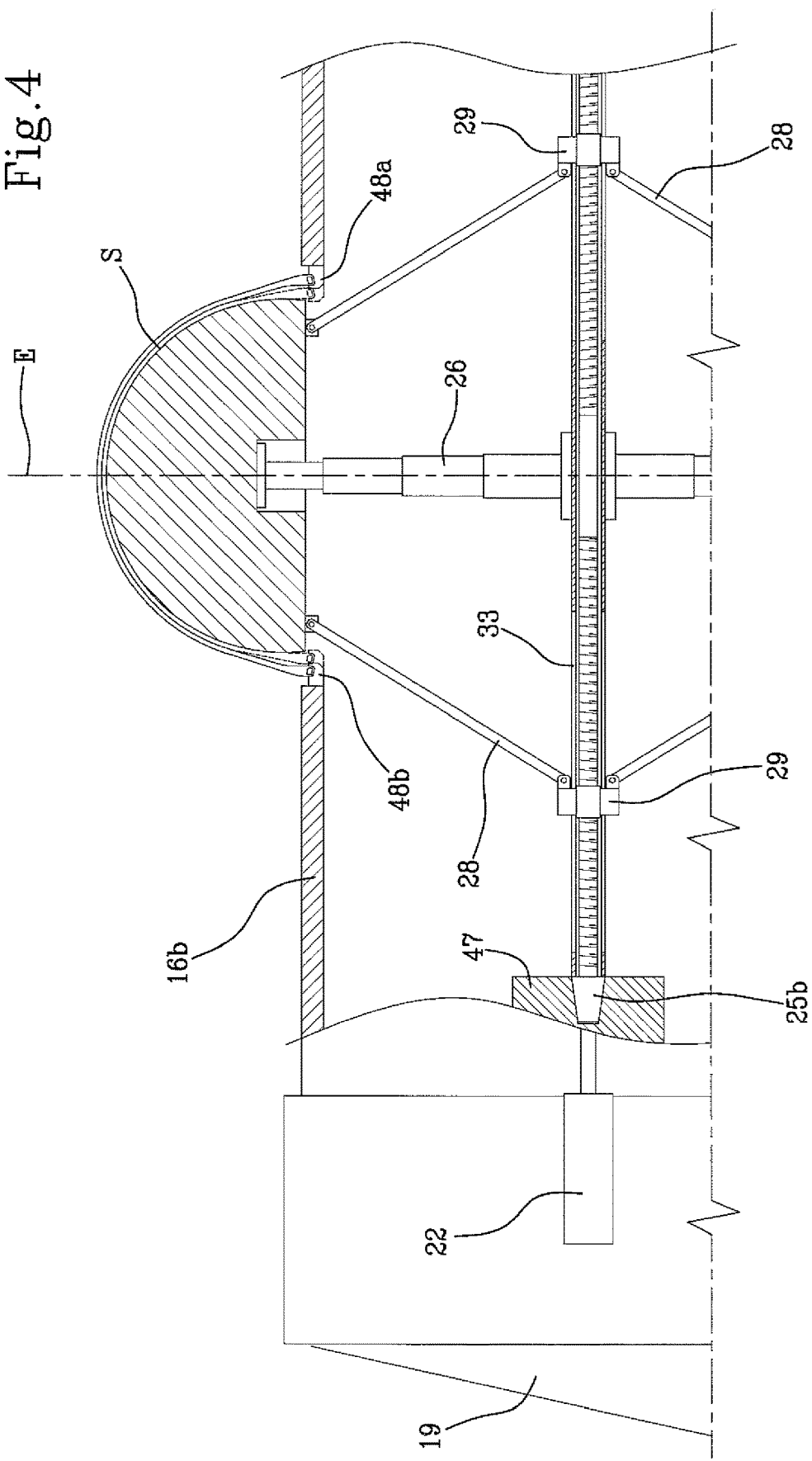
FIG. 4 schematically shows, in side view and partial section, the execution of the shaping of the carcass sleeve.
Figure 9:
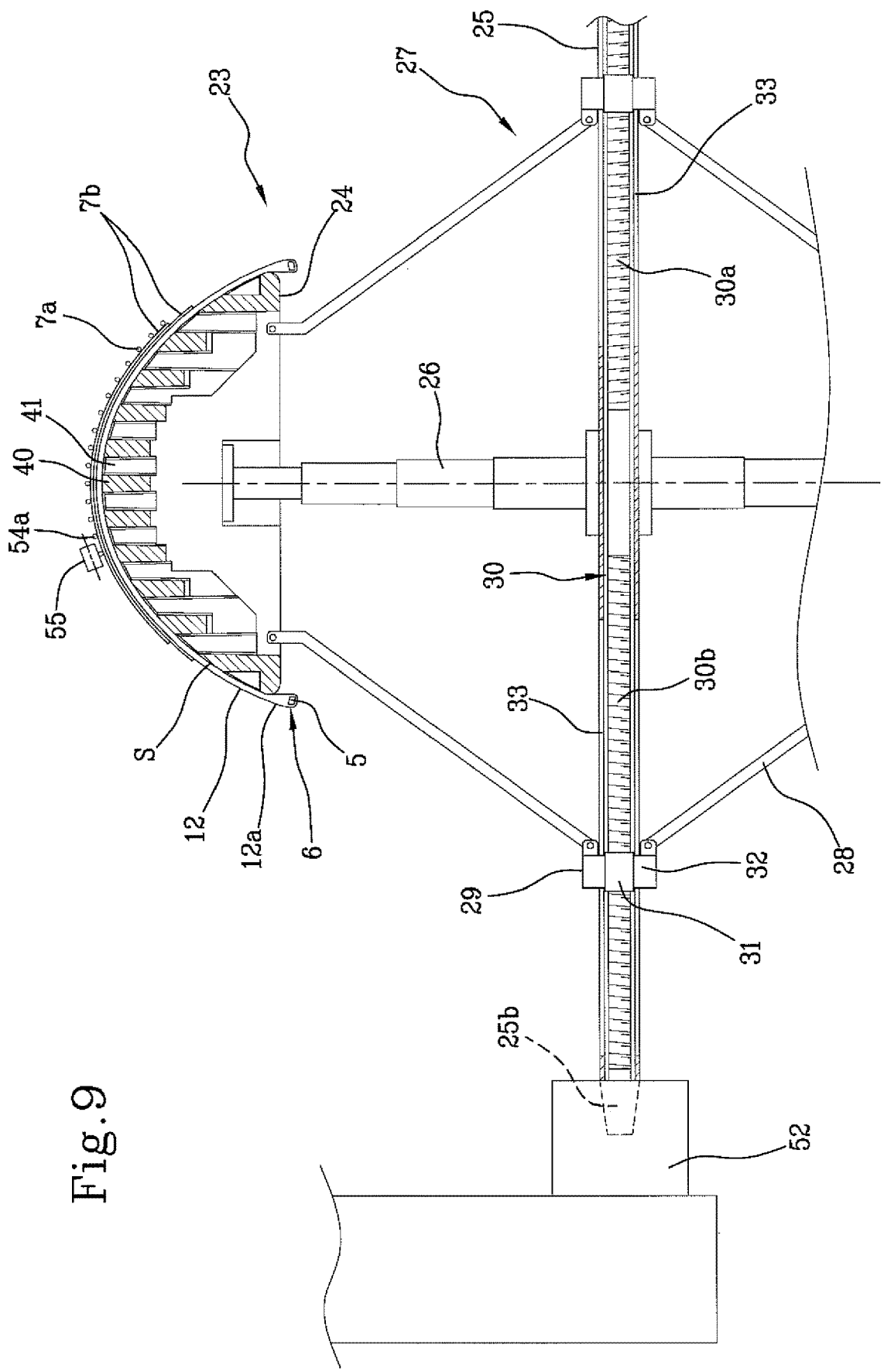
FIG. 9 shows the application of a belt layer on the shaped carcass sleeve and coupled to the forming drum.

The carcass loading devices 45 can for example comprise a carcass handling device 46 preferably operating on an external surface of the carcass sleeve 12. With a radial translation movement (with respect to the forming drum 23), the carcass sleeve 12 is first inserted, in axial alignment relation with the forming drum 23, between the flange elements 16a, 16b arranged in the loading/unloading condition (FIG. 2). The carcass sleeve 12 is subsequently arranged around the forming drum 23, preferably following an axial translation movement of the forming drum 23 itself. More particularly, with a movement of the carriage 19 along the linear guides 20, the forming drum 23 is coaxially inserted in the carcass sleeve 12.

Preferably, the translation of the carriage 19 and the forming drum 23 terminates with the engagement of a second end 25b of the central shaft 25 with a tailstock 47, situated inside the second flange element 16b (dashed line in FIG. 2).

For the axial movement of the forming drum 23 with respect to the carcass sleeve 12 to occur without mutual mechanical interferences, it is preferably provided that in the contracted condition, the forming drum 23 has a maximum external diameter smaller than a minimum internal diameter of the carcass sleeve 12, typically detectable at the beads 6.

At the end of the axial movement, each of the anchoring annular structures 5 integrated in the beads 6 is situated in axially internal position with respect to the circumferential engagement seat 17a, 17b of the respective first and second flange element 16a, 16b.

Upon action of the axial movement devices 22, the flange elements 16a, 16b then carry the respective engagement seats 17a, 17b substantially in radial alignment relation inside the annular anchoring structures 5.

Each of said flange elements 16a, 16b comprises expansion members (not depicted) configured for determining a radial expansion of respective circumferential seal rings 48a, 48b integrating the circumferential engagement seats 17a, 17b. Following such radial expansion, each of the circumferential seal rings 48a, 48b is brought to act in thrust relation against one of the anchoring annular structures 5. The carcass sleeve 12 is thus stably constrained to the flange elements 16a, 16b. Upon completed engagement, the carcass handling device 37 can disengage the carcass sleeve 12 and be removed from the shaping station 13.

During shaping, when the carcass sleeve 12 starts to radially expand, the radial expansion of the shaping drum can be driven by means of rotation of the threaded bar 30 upon action of the rotary driving device 34.

The coupling between the carcass sleeve 12 and the forming drum 23 is thus enabled. Such coupling occurs by bringing an internal surface of the carcass sleeve 12 in contact relation against the abutment surface "S" of the forming drum 23.

In order to facilitate an expansion of the carcass sleeve 12, it can be provided that in the final steps of approaching the maximum radial expansion condition of the carcass sleeve 12, the flange elements 16a, 16b are axially inserted in radially internal position with respect to the sectors 24 of the forming drum 23, which is about to reach the expanded condition.

Upon completed coupling, the flange elements 16a, 16b disengage the carcass sleeve 12, leaving it on the forming drum 23.

Carcass sleeve 12 and forming drum 23 in mutual coupling relation are adapted for being subjected to the action of the deposition devices 49, in order to form components of the tyre 2 being processed by means of application of one or more elementary semi-finished products in radially external position with respect to the abutment surface "S".

The deposition devices 49 can for example comprise at least one device 50 for building at least one belt layer in radially external position with respect to the shaped carcass sleeve 12. Such device 50 is preferably installed in a belt structure application station 51 that is remote with respect to said shaping station 13.

In order to allow the transfer of the forming drum 23 to the belt structure application station 51, it is provided that the forming drum 23 carrying the carcass sleeve 12 is supported by the mandrel 44 operating at the first end 25a of the central shaft 25, while the tailstock 47 is disengaged from the second end 25b of the central shaft 25 itself. With a retreat of the first flange element 16a, the shaping station 13 is brought back into the loading/unloading condition, freeing the access for an anthropomorphic robotic arm 52 or other suitable driving unit, which in turn engages the forming drum 23 at the second end 25b of the central shaft 25.

The robotic arm 52 transfers the forming drum 23 from the shaping station 13 to the belt structure application station 51. The robotic arm 52 also suitably moves the forming drum 23 in front of the belt layer building device 50, which can for example comprise a dispenser 53 which feeds at least one elementary semi-finished product 54a, e.g. in the form of a rubber-covered cord or another continuous elongated reinforcement element made of textile or metallic material. Preferably associated with the dispenser 53 is a preferably idle roller 55, or another suitable applicator member for the elementary semi-finished product 54a at the radially external surface of the tyre 2 being processed. The roller 55 operates in thrust relation against a surface portion of the elementary semi-finished product 54a, pressing it towards the abutment surface "S" in order to determine the application thereof according to axially contiguous circumferential coils, on the carcass sleeve 12 or other radially underlying element. For example, a belt layer 7a (at 0 degrees) can thus be obtained by winding the elementary semi-finished product in rubber-covered cord form according to axially adjacent circumferential coils around the abutment surface "S", while the forming drum 23 is driven in rotation and suitably moved by the robotic arm 52.

The rigidity of the forming drum 23 ensures a stable positioning of the single circumferential coils 44 formed directly on the external surface of the shaped carcass sleeve 12, without undesired deformations of the carcass sleeve 12 occurring due to the stresses transmitted on its external surface during application. The stickiness of the green elastomeric material that constitutes the carcass ply or plies 3 prevents undesired spontaneous and/or non-controlled movements of the single circumferential coils 44, without having to arrange for this purpose additional intermediate layers between the belt layer 7a in manufacturing step and the underlying application surface. In other words, a precise positioning is facilitated of the single circumferential coils 44 of the belt layer 7a, directly formed according to the desired final profile of the carcass sleeve 12 upon completed shaping, even when such profile has an accentuated transverse curvature as is for example found in tyres intended for motorcycles or two-wheel vehicles.

The belt structure application station 51 can if necessary comprise devices 57 for building one or more auxiliary layers 7b, to be applied on the shaped carcass sleeve 12 before or after the application of said at least one belt layer 7a. In particular, such auxiliary layers 7b can comprise textile or metallic parallel cords, arranged according to an orientation that is tilted with respect to the circumferential extension direction of the carcass sleeve 12, respectively crossed between auxiliary layers 7b adjacent to each other.

By means of the robotic arm 52, or by means of a second anthropomorphic robotic arm or handling device of another type, the forming drum 23 is then transferred from the belt structure application station 51 to a tread band application station 58, preferably constituting part of a green tyre completion line integrating the same belt structure application station 51.

In the tread band application station 58, a spiraling unit 59 can for example operate, configured for winding at least one elementary semi-finished product 54b in the form of a continuous elongated element made of elastomeric material according to circumferential coils, axially adjacent in mutual contact, at a radially external position around the belt structure 7, while the forming drum 23 is driven in rotation and suitably moved, e.g. by the same robotic arm 52, for distributing the circumferential coils according to a predefined scheme. The application of the elementary semi-finished product 54b in the form of a continuous elongated element also in this case occurs with the aid of a respective second applicator roller 60 operating in a manner analogous to that described with reference to the obtainment of the belt layer 7a. The plant 1 can also comprise devices for obtaining sidewalls (not illustrated) against axially opposite lateral portions of the carcass sleeve 12, which can operate in a manner analogous to the spiraling unit 59.

The geometric and size parameters of the projections 37, and cavities 39, arranged in the forming drum 23 allow suitably supporting the carcass sleeve 12 without this undergoing excessive distortions or localised stresses under the effect of the thrust exerted by the applicator roller 55, 60. Indeed, at each of the cavities 39, the carcass sleeve 12 is supported as a bridge between two axially contiguous projections 37. In this situation, the carcass sleeve 12 is adapted to act as a kind of bridge-like beam sustained between two supports, suitably opposing the thrust action exerted by the applicator roller 55, 60, even if such thrust is localised in an action area, measurable against the abutment surface "S" in a radial plane of the forming drum 23, having transverse size smaller than the transverse size of the hollow portions 41. This circumstance can for example occur when the thrust action of the roller 55 is concentrated on an elementary semi-finished product 54 having size smaller than the transverse size of the hollow portions 41, as is exemplified in FIG. 9, or when the transverse size of the hollow portions 41 is larger than the axial size of the applicator roller 60, as is exemplified in FIG. 10.

Figure 10:
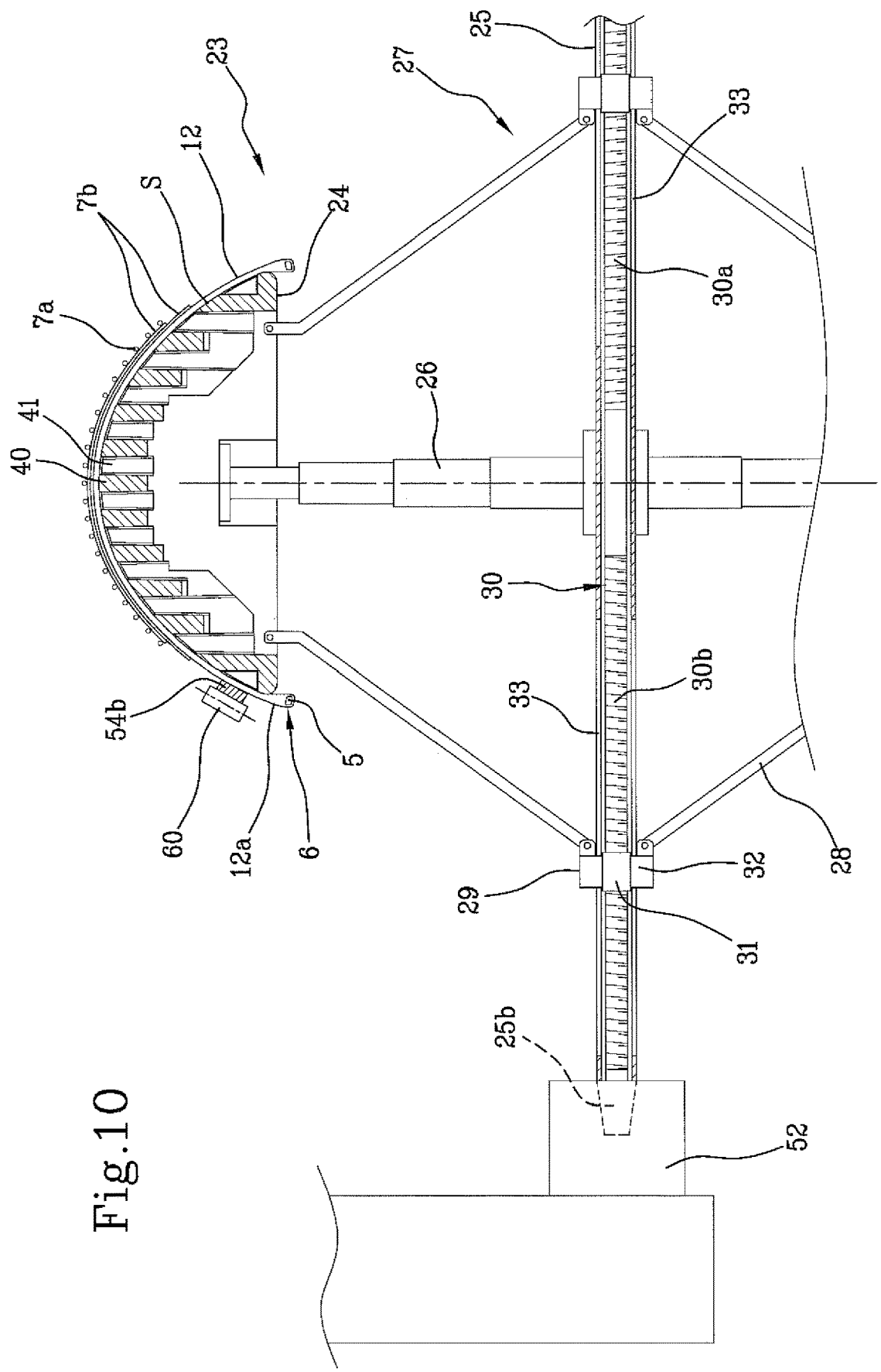
FIG. 10 shows the application of a tread band on a belt structure coupled to the carcass sleeve.

Indeed, illustrated in FIG. 10 is the application of the continuous elongated element for the purpose of obtaining the tread band 8. Due to the limited transverse size of the solid portions generated by the first axially terminal projections 37a, the extent to which terminal flaps 12a of the carcass sleeve 12 cantilever project from the abutment surface "S" is suitably limited.

It is thus possible to effectively apply tread band 8 and/or the sidewalls 9 up to close to the beads 6, without the carcass sleeve 12 having excessive structural yielding under the thrust action exerted by the applicator roller 60.

The built green tyre 2 is suitable for being removed from the forming drum 23 in order to then be vulcanised in a vulcanisation unit 61.

The invention claimed is:

1. An expandable toroidal forming drum for building tyres, comprising:
  circumferentially consecutive sectors radially moveable between a contracted condition in which said sectors are approached with respect to a geometric rotation axis of the forming drum, and an expanded condition in which the sectors are radially moveable away from said geometric axis in order to define a radially external abutment surface, wherein, in the expanded condition, the abutment surface has circumferential rows of solid portions alternated with hollow portions, and wherein the solid portions arranged along axially opposite circumferential edges of the abutment surface have a transverse size between 10% and 60% of a transverse size presented by the solid portions arranged in proximity to an axial centreline plane of the abutment surface.

2. The drum as claimed in claim 1, wherein the transverse size of the solid portions arranged along axially opposite circumferential edges of the abutment surface ranges between 20% and 50% of the transverse size presented by the solid portions arranged in proximity to the axial centreline plane of the abutment surface.

3. The drum as claimed in claim 1, wherein the transverse size of the solid portions is detectable in a radial plane of the forming drum.

4. The drum as claimed in claim 1, wherein each sector has circumferentially opposite coupling portions, each comprising elongated projections alternated with circumferentially extended cavities, wherein the projections of each sector are slidably engaged in respective cavities of circumferentially adjacent sectors.

5. The drum as claimed in claim 4, wherein said solid portions and hollow portions are respectively defined on said projections and by said cavities.

6. The drum as claimed in claim 4, wherein each of said cavities is axially delimited between lateral walls of two axially consecutive projections.

7. The drum as claimed in claim 4, wherein at least some of said projections have substantially plate-like structure and lie according to planes parallel to a circumferential extension direction of the abutment surface.

8. The drum as claimed in claim 6, wherein said lateral walls are extended according to planes substantially perpendicular to a geometric rotation axis of the forming drum.

9. The drum as claimed in claim 6, wherein at least some of said cavities are axially delimited, each between the lateral walls of two axially consecutive projections.

10. The drum as claimed in claim 4, wherein, in each sector, projections belonging to one of said coupling portions are offset with respect to projections belonging to the other coupling portion.

11. The drum as claimed in claim 4, wherein axially terminal cavities arranged along the axially opposite circumferential edges of the abutment surface are each delimitated between a base surface and a lateral wall, respectively converging, both carried by an axially terminal projection arranged along said circumferential edge.

12. The drum as claimed in claim 11, wherein said lateral wall is oriented according to a plane substantially perpendicular to the geometric rotation axis of the forming drum.

13. The drum as claimed in claim 11, wherein said base surface is oriented in a manner substantially parallel to the geometric rotation axis of the forming drum.

14. The drum as claimed in claim 4, wherein first axially terminal projections arranged along the axially opposite circumferential edges of the abutment surface are interconnected, substantially on an entire length, each with an axially adjacent projection.

15. The drum as claimed in claim 4, wherein first axially terminal projections arranged along the axially opposite circumferential edges of the abutment surface, each have a base surface converging with respect to a lateral wall of an axially adjacent projection, for delimiting one of said cavities between two axially contiguous solid portions of the abutment surface.

16. The drum as claimed in claim 4, wherein second axially terminal projections arranged along the axially opposite circumferential edges of the abutment surface, each have a base surface and a lateral wall, respectively converging, delimiting a respective solid portion of the abutment surface.

17. The drum as claimed in claim 4, wherein second axially terminal projections arranged along the axially opposite circumferential edges of the abutment surface, each have, at a respective base surface, a substantially arched longitudinal edge.

18. The drum as claimed in claim 4, wherein, in the contracted condition, the projections are inserted in the cavities according to a measure at least equal to 80% of a length of the cavities.

19. The drum as claimed in claim 4, wherein, in the expanded condition, the projections are extracted from the cavities according to a measure at least equal to 80% of a length of the cavities.

20. The drum as claimed in claim 4, wherein, at least in proximity to an axial centreline plane of the forming drum, each projection has an axial size between about 4 mm and about 15 mm.

21. The drum as claimed in claim 5, wherein the hollow portions in the expanded condition have a circumferential size between about 30 mm and about 60 mm.

22. The drum as claimed in claim 1, further comprising radial movement devices for simultaneously moving the sectors between the contracted condition and the expanded condition.

23. The drum as claimed in claim 22, wherein said radial movement devices comprise transmission mechanisms operatively engageable by actuator devices and configured for simultaneously translating the sectors from the contracted condition to the expanded condition.

24. The drum as claimed in claim 23, wherein said transmission mechanisms comprise driving levers, each driving lever hinged to one of said sectors and to at least one driving collar slidably fit along a central shaft.

25. The drum as claimed in claim 24, wherein the driving collar is operatively connected to a threaded bar rotatably engaged in the central shaft.

26. The drum as claimed in claim 24, comprising two driving collars slidably engaged on the central shaft in axially opposite positions with respect to the sectors, and engaging the threaded bar at respective right hand and left hand threads.

27. The drum as claimed in claim 1, wherein the sectors are carried by respective telescopically extendable guide members, radially extending from a central shaft.

28. The drum as claimed in claim 1, having, in expanded condition, a curvature ratio between about 0.15 and about 0.45.

* * * * *